United States Patent
Storey

(10) Patent No.: US 6,578,012 B1
(45) Date of Patent: *Jun. 10, 2003

(54) FULLY INTEGRATED, ON-LINE INTERACTIVE FREQUENCY AND AWARD REDEMPTION PROGRAM

(75) Inventor: Thomas W. Storey, Scottsdale, AZ (US)

(73) Assignee: Trilegiant Corporation, Norwalk, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 09/441,144

(22) Filed: Nov. 12, 1999

Related U.S. Application Data

(63) Continuation of application No. 09/105,227, filed on Jun. 25, 1998, now Pat. No. 6,009,412, which is a continuation of application No. 08/572,017, filed on Dec. 14, 1995, now Pat. No. 5,774,870.

(51) Int. Cl.$^7$ .............................................. G06F 17/60
(52) U.S. Cl. ......................................................... 705/14
(58) Field of Search ........................................... 705/14

(56) References Cited

U.S. PATENT DOCUMENTS

| | | | |
|---|---|---|---|
| 4,750,119 A | 6/1988 | Cohen et al. ................. | 705/35 |
| 4,885,685 A | 12/1989 | Wolfberg et al. ............. | 705/35 |
| 4,932,485 A | 6/1990 | Mori ....................... | 177/25.15 |
| 4,941,090 A | 7/1990 | McCarthy .................... | 705/14 |
| 4,949,256 A | 8/1990 | Humble ....................... | 705/14 |

(List continued on next page.)

FOREIGN PATENT DOCUMENTS

| | | |
|---|---|---|
| GB | 1 565 286 | 4/1980 |
| GB | 308224 | 3/1989 |
| GB | 2274349 A | 7/1994 |
| GB | 2 306 740 A | 5/1997 |
| GB | 2 315 351 A | 1/1998 |
| WO | WO 96/29668 A1 | 9/1996 |
| WO | WO 97/22058 A1 | 6/1997 |

OTHER PUBLICATIONS

Quinn, Judy, "The incentive industry gets smart", Incentive, vol. 168, No. 2 (Feb. 1994), p. 23.*

Petersen, Laurie, "A shopping spree in cyberspace", Catalog Age, vol. 12, No. 9 (Sep. 1, 1995), pp. 78–80.*

(List continued on next page.)

Primary Examiner—Eric W. Stamber
Assistant Examiner—Donald L. Champagne
(74) Attorney, Agent, or Firm—Rothwell, Figg, Ernst & Manbeck, P.C.

(57) ABSTRACT

An fully integrated on-line frequency award program is disclosed. A user may access the program on-line and may browse a product catalog for shopping. The user may electronically place an order, upon which the program automatically checks the user's credit and electronically issues a purchase order to the supplying company. The program also calculates award points, updates the award account of enrolled users, and communicates that number of awarded points to the user. Enrolled users may browse through an award catalog and electronically redeem an amount of awarded points towards an award. The program then electronically places an award redeeming order with the fulfillment house and updates the user's award account.

34 Claims, 6 Drawing Sheets

U.S. PATENT DOCUMENTS

| | | | |
|---|---|---|---|
| 4,992,940 A | 2/1991 | Dworkin | 364/401 |
| 5,025,372 A | 6/1991 | Burton et al. | 364/406 |
| 5,056,019 A | 10/1991 | Schultz et al. | 364/405 |
| 5,117,355 A | 5/1992 | McCarthy | 705/14 |
| 5,200,889 A | 4/1993 | Mori | 705/14 |
| 5,202,826 A | 4/1993 | McCarthy | 705/14 |
| 5,233,514 A | 8/1993 | Ayyoubi et al. | 705/14 |
| 5,287,268 A | 2/1994 | McCarthy | 705/14 |
| 5,483,444 A | 1/1996 | Heintzeman et al. | 385/381 |
| 5,513,102 A | 4/1996 | Auriemma | 705/14 |
| 5,537,314 A * | 7/1996 | Kanter | 705/14 |
| 5,687,322 A | 11/1997 | Deaton et al. | 705/14 |
| 5,689,100 A | 11/1997 | Carrithers et al. | 235/380 |
| 5,708,780 A | 1/1998 | Levergood et al. | 395/200.12 |
| 5,715,314 A | 2/1998 | Payne et al. | 380/24 |
| 5,734,838 A | 3/1998 | Robinson et al. | 705/14 |
| 5,761,648 A | 6/1998 | Golden et al. | 705/14 |
| 5,765,141 A | 6/1998 | Spector | 705/14 |
| 5,774,870 A | 6/1998 | Storey | 705/14 |
| 5,794,210 A | 8/1998 | Goldhaber et al. | 705/14 |
| 5,806,044 A | 9/1998 | Powell | 705/14 |
| 5,806,045 A | 9/1998 | Biorge et al. | 705/14 |
| 5,909,492 A | 6/1999 | Payne et al. | 705/78 |
| 5,937,390 A | 8/1999 | Hyodo | 705/14 |
| 6,009,412 A | 12/1999 | Storey | 705/4 |
| 6,009,415 A | 12/1999 | Shurling et al. | 705/35 |
| 6,029,141 A | 2/2000 | Bezos et al. | 705/27 |
| 6,049,778 A | 4/2000 | Walker et al. | 705/14 |
| 6,061,660 A | 5/2000 | Eggleston et al. | 705/14 |
| 6,081,788 A | 6/2000 | Appleman et al. | 705/14 |
| 6,148,400 A | 11/2000 | Arnold | 713/168 |
| 6,243,688 B1 | 6/2001 | Kalina | 705/14 |

OTHER PUBLICATIONS

"Chase–ing After Smart Electronic Commerce", Sep. 15, 1995, Network Computing, p. 26.

Jackie Cohen, "Merchant Server Market Heats Up", Feb. 1, 1997, Bank Technology News.

"Public–Key Algorithms", Chapter 19 p. 20, pp. 461–502, 1996, XP–002128601.

Eric Brown, "No Small Change", Micropa, New Media (Jun. 23, 1997), pp30–37.

International Search Report (mailed Mar. 21, 1997), PCT/US96/19728.

Press Release, "Harrah's Casino Introduces Two 'Firsts' for the Casino Industry" (Aug. 23, 1993).

"Give Cyber–Ready Consumers the Once Over", Interactive Marketing News, vol. 2, No. 13, Jun. 23, 1995.

Churbuck, "Dial–a–Catalog", Forbes (Oct. 10, 1994). 126/3).

Hirsch, "Using the Internet to Reach Clients", American Printer, p. 64 (Nov. 1, 1995).

Ernex Loyalty or Rewards Programs Explanation at URL=http://www.stockgroup.com/csu/ernex/ernex.htm (printed on Nov. 23, 1997).

Article entitled "B–to–B Tests Interactive Media", Advertising Age, pp. B14–B15 (Aug. 1995).

"What is Agshare?", at URL=http://www.swp.com/services/agshare.htm (printed on Nov. 23, 1997).

Berlin, "Internet World Feb. 1996—Riddle Me This", at URL=http://www.iw.com/1996/02/recroom.html (Feb., 1996).

Web page "What is SuperClub" at URL=http://www.super-club.ie/whatis.html, printed Nov. 23, 1997.

Anthes, "MCI Cuts Ribbon on Digital Mall," Computerworld, p. 15 (Nov. 28, 1994).

Hoffman et al., "Amex Travels the Net," Computerworld, p. 63 (Feb. 27, 1995).

Kaufman, "Taking Inventory of your Frequent–flier Miles," Money (Apr., 1995).

Rodriguez, "MCI Rolls out Internet Electronic Commerce," Infoworld, p. 12 (Apr. 3, 1995).

Article entitled "eShop makes IMRA Connection," Discount Store News, p. 4 (Mar. 6, 1995).

* cited by examiner

FULLY INTEGRATED, ON-LINE INTERACTIVE FREQUENCY AND AWARD REDEMPTION PROGRAM

This application is a continuation application of application Ser. No. 09/105,227 filed on Jun. 25, 1998, now U.S. Pat. No. 6,009,412, which is a continuation of application Ser. No. 08/572,017, filed on Dec. 14, 1995, now U.S. Pat. No. 5,774,870.

BACKGROUND OF THE INVENTION

1. Field of the Invention

The present invention relates to frequency and award redemption program. More particularly, the present invention relates to an on-line, interactive frequency and award redemption program which is fully integrated.

2. Description of Related Art

Frequency programs have been developed by the travel industry to promote customer loyalty. An example of such a program is a "frequent flyer" program. According to such a program, when a traveler books a flight, a certain amount of "millage points" is calculated by a formula using the distance of the destination as a parameter. However, the millage points are not awarded until the traveler actually takes the flight.

When a traveler has accumulated sufficient number of millage points, he may redeem these points for an award chosen from a specific list of awards specified by the program. Thus, for example, the traveler may redeem the points for a free flight ticket or a free rental car. In order to redeem the accumulated points, the traveler generally needs to request a certificate, and use the issued certificate as payment for the free travel.

While the above program may induce customer loyalty, it has the disadvantage that the selection of prizes can be made only from the limited list of awards provided by the company. For example, a traveler may redeem the certificate for flights between only those destinations to which the carrier has a regular service. Another disadvantage is that the customer generally needs to plan ahead in sufficient time to order and receive the award certificate.

According to another type of frequency and award program, a credit instrument is provided and credit points are accumulated instead of the millage points. In such programs, bonus points are awarded by using a formula in which a price paid for merchandise is a parameter. Thus, upon each purchase a certain number of bonus points are awarded, which translate to dollar credit amount. According to these programs, the customer receives a credit instrument which may be acceptable by many enrolled retailers, so that the selection of prizes available is enhanced. An example of such a program is disclosed in E.P.A. 308,224. However, while such programs may enhance the selection of prizes, there is still the problem of obtaining the credit instrument for redeeming the awarded points. In addition, the enrolee must allow for processing time before the bonus points are recorded and made available as redeemable credit. Thus, the immediacy effect of the reward is lacking in these conventional incentive programs.

SUMMARY OF THE INVENTION

In view of the above, the present invention is advantageous in that it provides an on-line, interactive incentive program which is fully integrated.

The disclosed invention is also advantageous in that it provides an on-line access to product information, product purchases using an on-line electronic order form, award catalogs, and award redemption using an on-line electronic redemption forms.

Another advantage of the subject invention is that it awards bonus points immediately upon purchase of a merchandise.

The present invention is further advantageous in that it provides bonus points which are immediately made available for redemption.

Another advantage of the present invention is that it allows the to customer to select a prize immediately upon the award of the bonus points.

A further advantage of the present invention is that it allows a customer to order a prize and redeem the awarded points towards the ordered prize immediately upon the award of the bonus points, thus enhancing the immediacy effect of the reward program.

Yet another advantage of the present invention is that it provides an electronic sign-up form for on-line signing up by users.

The above and other advantages are provided by the disclosed invention which includes provisions for access over the internet. Upon gaining of an access, the customer is able to browse through a merchandize catalog, an award catalog, view the bonus points available for redemption in the customer's award bonus account, and get information about the products for purchase, the program, and the customer's account. The program also enables the customer to order merchandize on-line, order prizes on-line and redeem awarded points on-line. Accordingly, the selection of available prizes is expanded by the merchants who join the program, and the bonus award is made instantly redeemable.

BRIEF DESCRIPTION OF THE DRAWINGS

Other objects and advantages of the present invention will become apparent from the following description of the preferred embodiment with reference to the drawings, in which.

DETAILED DESCRIPTION OF THE PREFERRED EMBODIMENT

Figure 1:
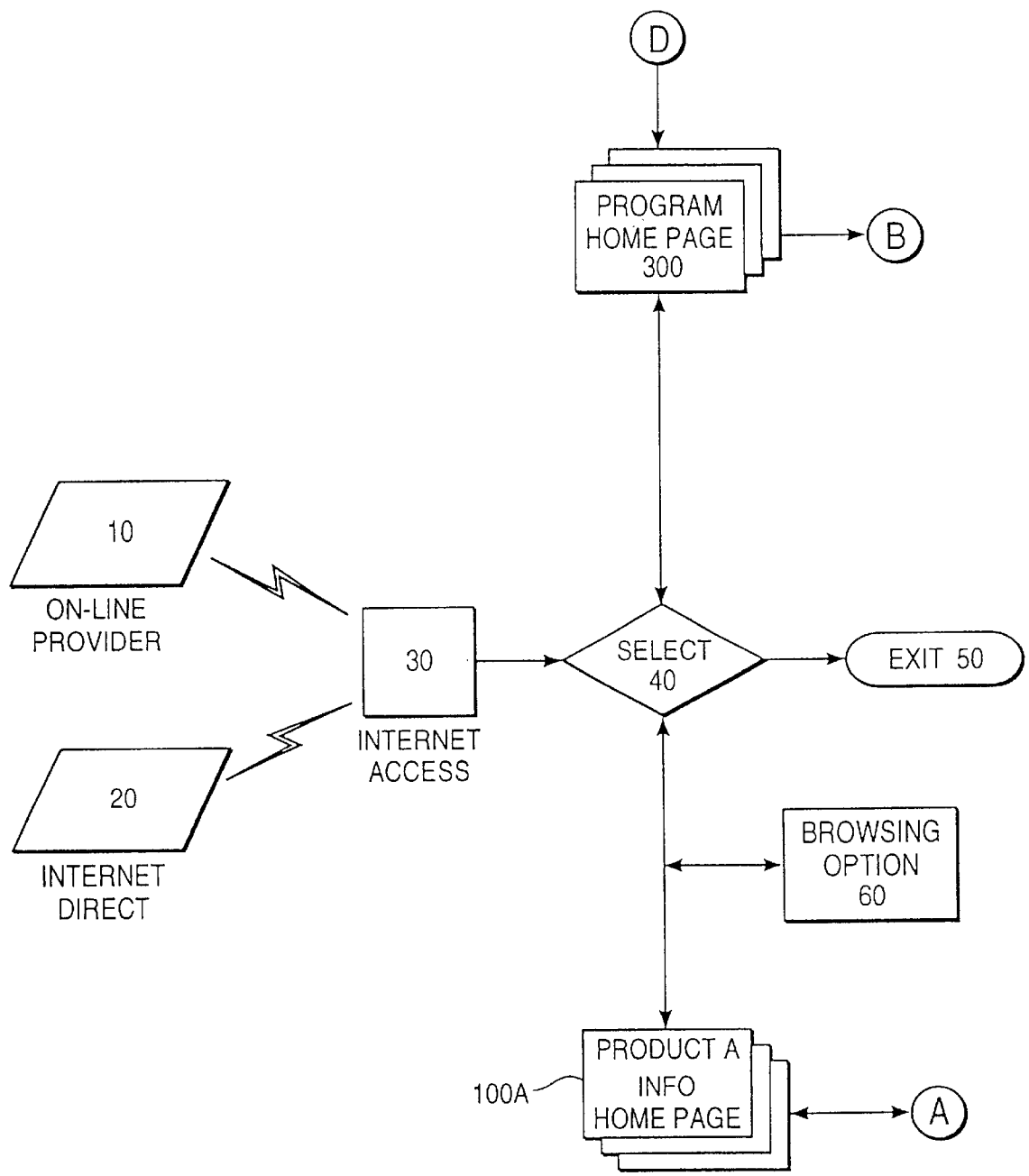
FIG. 1 is a flow chart showing the access part of the program of the preferred embodiment of the present invention.

The program according to the present invention will be described with reference to FIGS. 1–5. FIG. 1 is a flow chart showing the access part of the program. In FIG. 1, 10 indicates access via an on-line provider such as AOL™, CompuServe™ etc. On the other hand, 20 indicates a direct access to the internet, such as via Netscape™. Upon gaining an access to the internet, 30, the program proceeds to a selection menu 40. Depending on the user's choice, from the selection menu 40 the program may proceed to PRODUCT A HOMEPAGE 100A or PROGRAM HOMEPAGE 300. Alternatively the user may choose to exit the program via EXIT, 50.

It should be noted from the outset that in the preferred embodiment of the disclosed invention, the user may backtrack from any particular point in the program. Notably, the user is able to return to selection menu 40 from any part of the program. This being stated generally, it will be appreciated that this feature is applicable to the further program steps of the preferred embodiment described below and, therefore, it will not be repeated in the following description.

In FIG. 1, PRODUCT A HOMEPAGE, 100A, is a homepage of a particular type of products. For example, PRODUCT A HOMEPAGE, 100A, may be a homepage for men's shirts. In such an example, the PRODUCT A HOMEPAGE, 100A, may include icons to allow the user to select information regarding, for example, different brands, price ranges, types (dress shirts, sport shirts, etc.), and thereafter review the products available relating to the particular selection in a manner much similar to reviewing a printed product catalogue.

Alternatively PRODUCT A HOMEPAGE, 100A, may identify a particular brand. In such an example PRODUCT A HOMEPAGE, 100A, may include icons to allow the user to review information regarding particular products sold by this particular brand.

In the preferred embodiment, the capability to view information regarding the various products is enhanced by providing the user with various "browsing" options, generally implemented in the form of icons. This is depicted in FIG. 1 as BROWSING OPTION 60. Thus, for example, the user may choose to list the products alphabetically, list the brands alphabetically, or use a search engine to create a group of products which fit the user's requirements. Any conventional search engine may be used for this purpose. Such a search engine can be implemented for accepting a boolean string, or by collecting the user's response to an inquiry set. The fields for the search engine may include, for example, key words, brands, price range, material etc.

In FIG. 1, BROWSING OPTION 60 is shown at the same level as PRODUCT A HOMEPAGE, 100A, to indicate that in the preferred embodiment the user may go directly to view the products information, or arrange a new list of products according to the user's needs. However, it will be appreciated by those skilled in the art, that other arrangements are possible. For example, BROWSING OPTION, 60, can be inserted between SELECTION MENU 40 and PRODUCT A HOMEPAGE 100A so that the user may have to enter his preferred way of viewing the products before the user is able to select the products' homepage.

In the Figures, PRODUCT A HOMEPAGE, 100A, is depicted as multiple pages. This depiction signifies two features of the program of the present invention. The first feature, is that PRODUCT A HOMEPAGE, 100A, may include more than one page. Thus, if a large amount of information needs to be included in PRODUCT A HOMEPAGE, 100A, the homepage may actually comprise several pages and the user will be provided with a scroll option so as to be able to scroll over the information pages. Another feature is that from the selection menu 40 the user may be able to choose other products homepage such as, for example, PRODUCT B HOMEPAGE, PRODUCT C HOMEPAGE, etc., which are depicted impliedly in the drawings as pages following PRODUCT A HOMEPAGE, 100A.

In a similar manner, PROGRAM HOMEPAGE, 300, is shown in the Figures as multiple pages. (It will be understood by those skilled in the art that PROGRAM HOMEPAGE 300 is the main internet address for the incentive program system). This depiction also signifies two features of the program of the present invention. The first feature, is that PROGRAM HOMEPAGE, 300, may comprise multiple pages with a scrolling feature to allow the user to scroll for viewing the information contained in the pages. The second feature is that several incentive programs, or incentive level programs may be available for access from the selection menu 40. For example, several different programs may be accessible, each program being managed by a different incentive company. Alternatively, or in addition, several incentive level programs may be accessible from the selection menu 40.

In the case of several incentive level programs, restrictions may be imposed for accessibility to the various incentive level programs. For example, a particular incentive company may manage three incentive programs: white, silver and gold. The white incentive program can be accessible for enrollment by any approved user. On the other hand, the incentive company may allow limited access to the silver and gold incentive programs for providing information only, while enrollment may be restricted only to those users who satisfy set requirements. These requirements may relate, for example, to a certain level of purchasing within a given period, credit rating, gross salary, special company promotion program, etc. As in the above, while these various features have been described herein, they are depicted in the drawing simply by showing multiple pages following PROGRAM HOMEPAGE 300.

Figure 2:
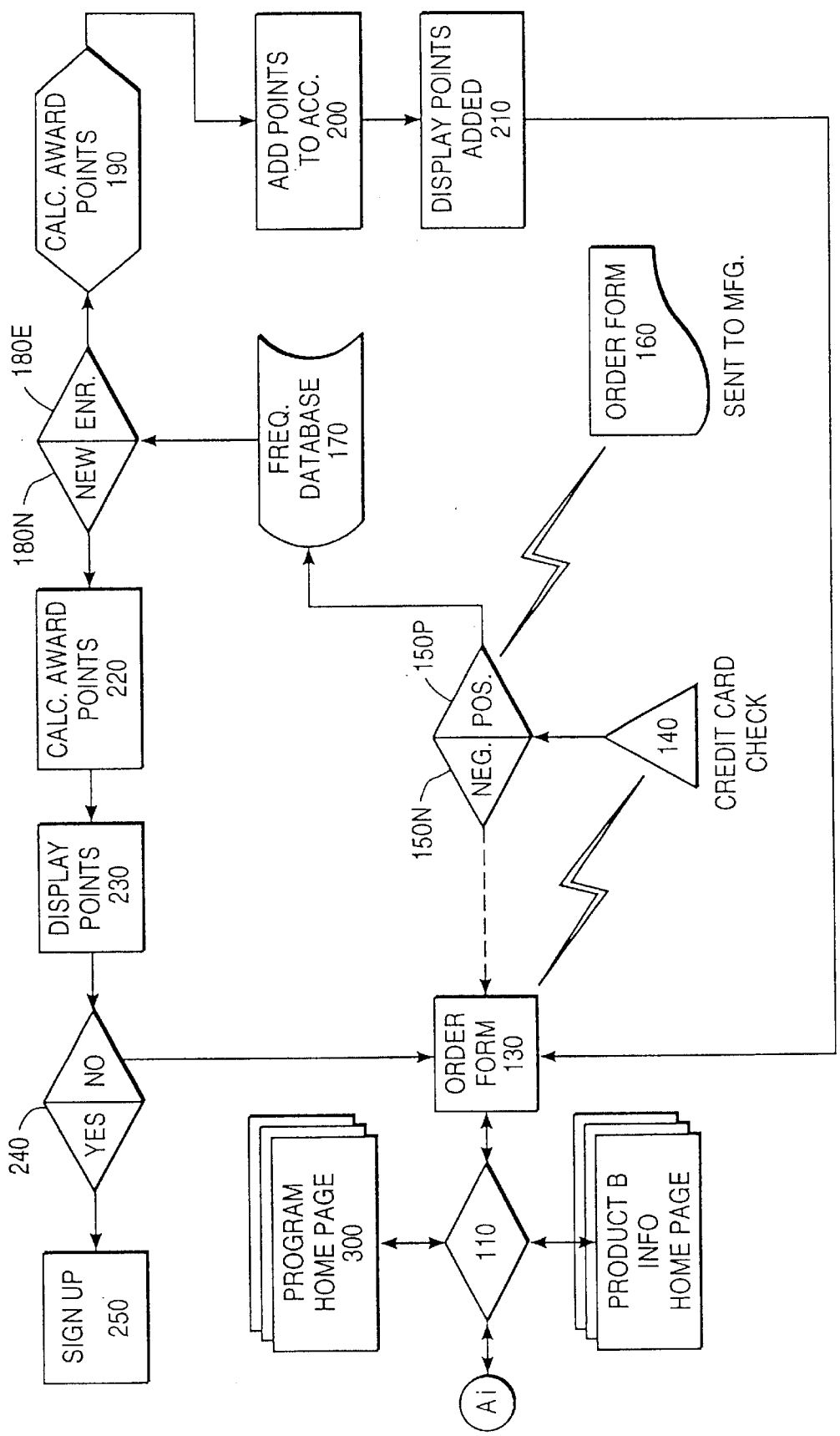
FIG. 2 is a flow chart showing the product selection and on-line purchase part of the program of the preferred embodiment of the present invention.

If a user selects PRODUCT A HOMEPAGE 100A, the program proceeds to a selection menu 110, shown in FIG. 2. Incidentally, the routines shown in FIG. 2 are depicted to proceed from the routine of FIG. 1 by the designation Ai. This designation is to alert the reader that this particular routine is generic to all the other products homepage, such as PRODUCT B HOMEPAGE, PRODUCT C HOMEPAGE, etc. Therefore, while the description provided herein relates to PRODUCT A HOMEPAGE, 100A, this is only for demonstration purposes and it will be appreciated by those skilled in the art that similar processing would follow upon selection of a different product homepage.

With continued reference to FIG. 2, selection menu 110 provides the user with the following options: proceed to PROGRAM HOMEPAGE 300, proceed to PRODUCT i HOMEPAGE, 100i, (i being any of the number of available products homepage) or proceed to ORDER FORM 130. Alternatively, the user may change the list of products by choosing the appropriate browsing option or using the search engine to create a new list of products (not shown). Upon selection of PRODUCT i HOMEPAGE, 100i, the program reverts to step Ai, i.e., to SELECTION MENU 110. Upon selection of PROGRAM HOMEPAGE 300, the program proceeds to step B shown in FIG. 3, which will be described later.

If the user decides to purchase an item, the program proceeds to ORDER FORM 130 and the user is prompted to electronically provide entries to the appropriate quarries in the order form. Thereupon, a communication link is established and the program performs a CREDIT CHECK routine, 140, to verify the availability of funds for purchase.

At this juncture, a particular feature of the program of the present invention will be described. As noted above and shown in FIG. 1, the user may access the internet using an on-line provider or an internet direct access. If the user is accessing the internet via an on-line provider, his credit information (account number, type of credit card etc.) is available directly from the on-line provider. Accordingly, in performing the CREDIT CHECK routine 140, the information needed for the credit check can be obtained from the on-line provider. Alternatively, if the user gained access via an internet direct method, the CREDIT CHECK routine 140 may provide an inquiry screen requesting the user to enter his credit information.

A related feature of the present invention is that when the user enters ORDER FORM 130 from a particular product homepage describing a particular product, it is very likely that the user wishes to purchase that particular product. Therefore, the relevant information regarding the product can be read from the product's homepage and pasted at the appropriate positions in the ORDER FORM 130. Thus, the user will only have to enter information specific to options such as size, color, quantity, etc.

At step 130, certain predetermined information is striped off from the completed order form and sent to the credit check 140. Such information may be, for example, credit card number and dollar amount. This is because much of the information included in the order form is irrelevant to the person's credit, and the credit institution may be unable to handle the extra information. Furthermore, sending the least amount of information would expedite the credit check.

If the CREDIT CHECK routine 140 result is negative, in step 150N the user is provided with a message to that effect. The program may then prompt the user to enter another credit card number or to exit. However, if the CREDIT CHECK routine 140 result is positive, in step 150P the program proceeds to establish a communication link and places a PRODUCT ORDER, 160, with the product company. As shown in FIG. 2, in the preferred embodiment PRODUCT ORDER 160 is placed by electronic means such as e-mail or facsimile so as to render the program of the present invention fully integrated in an interactive on-line system; however, the ORDER FORM 160 can alternatively be place by conventional means by simply printing and mailing the ORDER FORM 160 to the product company.

As shown in FIG. 2, while the communication link is established to the product company, the program also proceeds to the FREQUENCY DATABASE, 170. In FREQUENCY DATABASE 170 the user's information is checked against the database of enrolled users. If it is determined that the user is an enrolled user, 180E, the program proceeds to step 190 to calculate the award points according to a preprogrammed formula. Thereafter the program proceeds to add the points to the enrolled user's account, 200, and display the account information and the added points to the user, 210. From this point, the program may return to ORDER FORM 130, to step Ai (not shown), to PROGRAM HOMEPAGE 300 to view the awards catalog (not shown) or proceed to SELECTION MENU, 40, (not shown).

The preferred embodiment includes a particular feature wherein in addition to displaying the points added to the account, the program includes a routine to display a selected award or product, and the number of points the user is short of in order to receive that award or product. For example, during particular periods certain awards or products may be designated as under a "special program". Thus, during those periods, the award would require a reduced number of points and/or the product would be available under special favorable terms. The user may be notified of that fact, to thereby entice the user to purchase additional products in order to qualify for the "special program" terms.

In order to implement the "special program," the information regarding the award/product needs to be read. The number of points required to redeem the particular qualifying award is then fetched. Similarly, the user's account is accessed and the number of points in the user account is fetched. The number of points read from the user's account is subtracted from the number of points read from the award information and the result is displayed as the number of points the user is short of to redeem the particular qualified award. An exemplary flow chart is provided in FIG. 6.

On the other hand, if in step 170 it was determined that the user is a new, unenrolled user, 180N, the program proceeds to step 220 to calculate the award points according to the preprogrammed formula. Thereafter, the program proceeds to step 130, wherein a message is sent to the user identifying how many points he will earn should he enroll in the program. Step 230 also inquires whether the user is interested in joining the program. Accordingly, step 230 may be in a form of a message such as, for example, "By enrolling in the incentive program you will earn [X] points for purchasing the [insert the item purchased]. These points may be redeemed toward exciting awards. Are you interested in enrolling or viewing the award catalog? Y/N."

If in step 240 the user selects NO in response to step 230, the program proceeds to ORDER FORM 130 or to process Ai (not shown), which proceeds to SELECTION MENU 110. Alternatively, after receiving NO in step 240 process may continue to SELECTION MENU 40. At step 240, if it is determined that the user would like to sign up with the award program (join), the program proceeds to step 250 which is a sign up routine. Any conventional sign up routine may be used at this stage of processing. At the end of the sign up routine, the program can return to point Ai, or to the purchase order form. The user may sign off from any of these locations.

Figure 5:
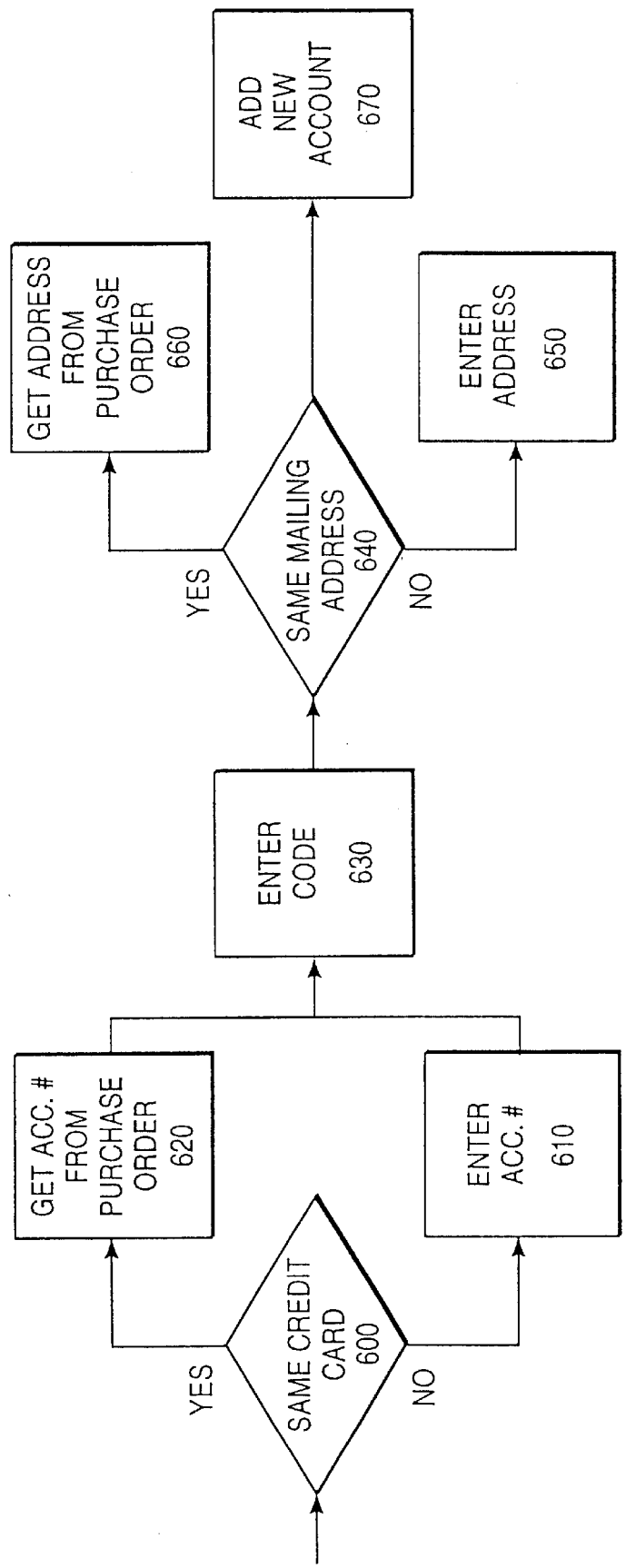
FIG. 5 is a flow chart showing an enrollment routine.

For illustration purposes, a general flow of an enrollment routine for signing up is shown in FIG. 5. This routine may be entered from may different places in the program, e.g., after making a purchase, after reviewing information regarding the program, etc. Accordingly, the beginning of the routine of FIG. 5 is shown "floating."

At step 600 the user is prompted either to enter a credit card account number, 610, or to indicate that he wishes to use the same account used to access the internet or to purchase an item, in which case the account number is obtained from within the program, 620. (It should be recognized that the user's name can also be obtained internally from the on-line access program.) At 630 the user is prompted to enter a personal identification code, which can generally be a four letter/number code. At 640 the user is prompted to enter his choice of mailing address—the address indicated on the order form, 660, or a different address, 650. (A different address can be entered in the order form, for example, when purchasing a present to be mailed to the recipient). At 670 the program creates a new account in the database.

In FIG. 2, steps 190 and 220 may be combined and the awards point calculated before reaching step 170. That is, upon obtaining a positive credit check at step 150P, the program can proceed to calculate the award points before proceeding to step 170. Then after performing step 180, process can proceed either to step 200, when it was determined that the user is an enrolled user (180E), or to step 230, when it is determined that the user is not an enrolled user (180N).

In the description of the preferred embodiment, the term product also refers to a gift certificate. The following examples are provided in order to make this feature clearer to the reader. When a user accesses the various product homepages, the user has the option to purchase a gift certificate rather than purchasing an actual product. The gift certificate can be directed to a particular merchant, a particular manufacturer/brand, or to all the products available through the program.

In the preferred embodiment the gift certificate is sent electronically to a computer designated by the user to be printed by a printer linked to the designated computer. Thus, for example, if the user knows the account number of the recipient of the gift certificate, the user may purchase the gift certificate and designate the recipient's account as the designated computer. Accordingly, the gift certificate will be electronically sent to the recipient's computer, or electronically added to the recipient's account while electronically informing the recipient of the transaction. Therefore, the user will not have to mail the certificate to the recipient.

It should also be realized that the user will be credited award points corresponding to the price of the gift certificate purchased. Thus, while the recipient will receive the gift certificate for purchases, the user will receive the award points. In addition, the user may use award points from his account as payment for the purchasing of a gift certificate; thus effectively making the award points available for purchases by a recipient. This can be user to entice unenrolled recipients to join the program.

Figure 3:
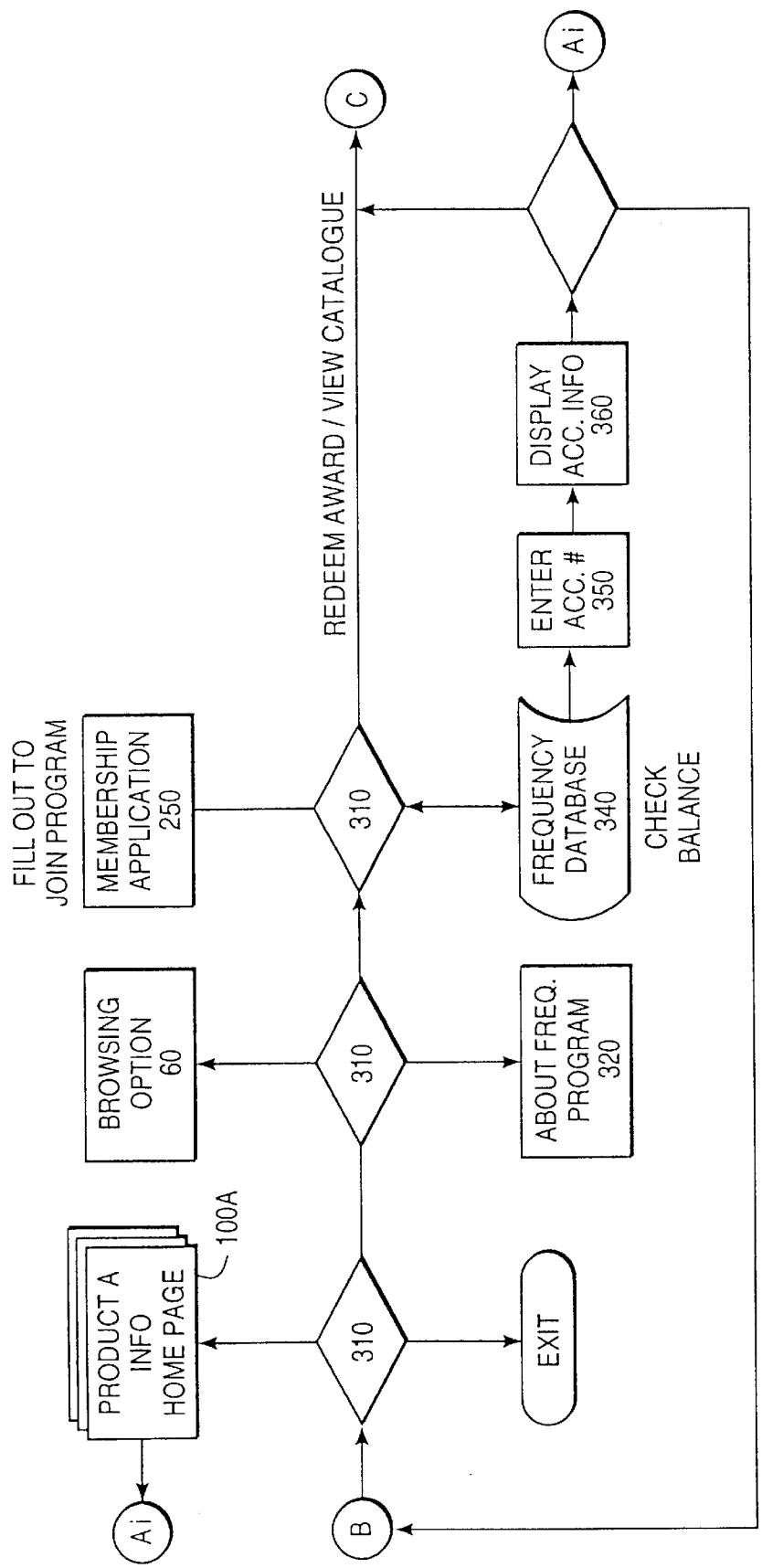
FIG. 3 is a flow chart showing the membership part of the program of the preferred embodiment of the present invention.

When a user selects PROGRAM HOMEPAGE 300 (e.g., from SELECTION MENU 40 or from SELECTION MENU 110), the program proceeds through to SELECTION MENU 310, shown in FIG. 3. In FIG. 3, SELECTION MENU 310 is shown as three consecutive decision points. This represents the structure in the preferred embodiment wherein each of the options shown branching from the three decision points are available for selection from PROGRAM HOMEPAGE 300.

Figure 4:
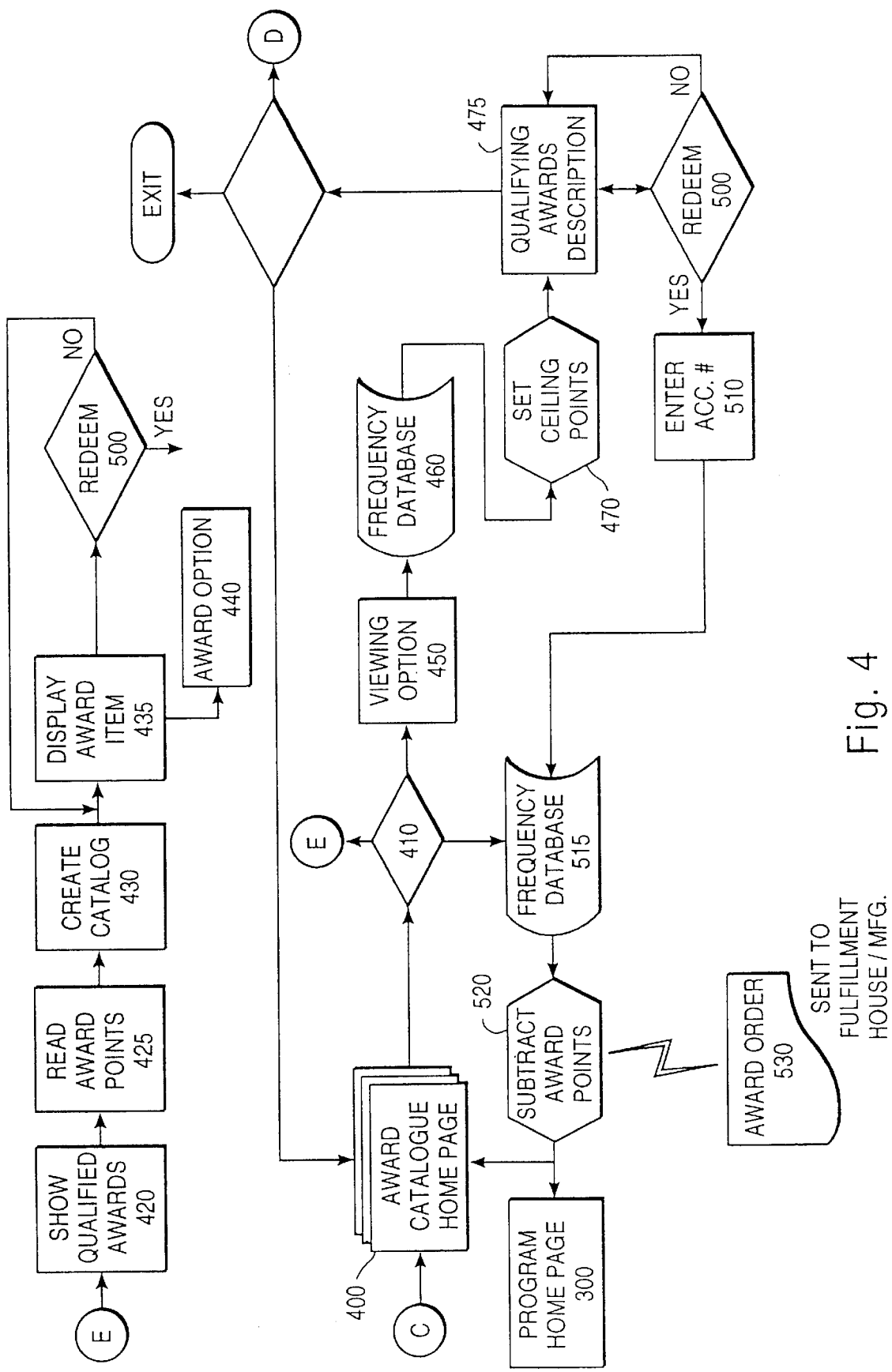
FIG. 4 is a flow chart showing the award redemption part of the program of the preferred embodiment of the present invention.

SELECTION MENU 310 allows the user to exit the program, go to PRODUCT Ai HOMEPAGE 100A (from which program would proceed to Ai in FIG. 2), go to the BROWSING OPTION 60, learn about the award program by selecting ABOUT AWARD PROGRAM 320, apply for membership by selecting MEMBERSHIP APPLICATION 250 (see, FIGS. 2 and 5), review the user's account by selecting the FREQUENCY DATA BASE 340, or review the awards catalog by selecting AWARD CATALOG HOMEPAGE 400 (shown in FIG. 4).

Upon selecting FREQUENCY DATABASE 340, the user will be prompted to enter the account number, the identification code, or both at step 350. In the program of the present invention, the account number and the identification code are linked together, for user for which they are available. Thus, when a user account is established in the frequency database, data is included to link the user's account number to the user's identification code. (It should be noted that account number can refer to a credit card account number, an account number internal to the program, etc.)

If the user has entered the internet via an on-line provider 10, his credit card account number can be obtain on-line from the on-line provider. Therefore, rather than prompting the user to enter his credit card account number or his program account number, the credit card account number can be obtained on line from the on-line provider, and the account can be matched against the accounts in the frequency database. If a match is obtained, the program account number can be read from the frequency database. However, for security purposes, it is preferable that the program will not proceed to step 360 to display the account information before the user has been prompted and has entered at least the correct identification code at step 350, which is matched with the account number.

If the user selects AWARD CATALOG HOMEPAGE 400 processing proceeds-to the routine shown in FIG. 4. In the preferred embodiment several options are available for viewing the award catalog. This is represented by the SELECTION MENU 410, although those skilled in the art would recognize that other processing can be provided for viewing the award catalog. As shown in FIG. 4, at least two options are made available by SELECTION MENU 410: SHOW QUALIFIED AWARDS 420 (shown continuing at branch E) and VIEWING OPTIONS 450. QUALIFIED AWARDS 420 allows the user a quick access to viewing all the awards the user is qualified for. VIEWING OPTIONS 450 allows the user to view the awards according to the order selected by the user.

If the user selects QUALIFIED AWARDS 420, the frequency database is accessed to determine the award point, 425. Thereafter, the entire award catalog is scanned and a qualified awards database is created for the particular number of award points read from the user's account, 430. Thereafter, the first page of the first award is displayed, 435, and the user can brows through the catalog created in step 430. Alternatively, the user can select QUALIFIED AWARD OPTION 440 for different options of arranging and viewing the qualified awards catalog. These options can be, for example, by alphabetical order, by brands, by product, etc.

While the above method of displaying the qualified awards is workable, it may take too much time to scan all the awards in order to "custom" build a qualified awards catalog. Therefore, other alternatives may be used for creating the qualified award catalog. According to the preferred alternative, point levels are defined. For example, point level 1 can include all awards of value up to 500 points, point level 2, up to 1000 points, etc. When the user's account is read at 425, the highest point level the user is qualified for is determined. At this point a message may be displayed such as "You are qualified for point level 3 and have additional 350 points in your account. To qualify for point level 4 you will need 150 additional points".

If memory size is not a problem, different libraries can be stored, each of which corresponding to a certain point level. Thus, for example, award library 1 can include all the awards which can be redeemed by a number of points defined by point level 1. In the above example, award library 1 will include all awards worth up to 500 points. Thus, when the point level of the user is determined, all the awards in the corresponding library are made accessible as qualified awards. This allow for fast access, since the step 430 of creating the qualified catalog is skipped. However, such system may require large amount of memory, since many libraries may be needed to store the various awards of different point levels.

In the preferred embodiment the award libraries are arranged in a progressive manner, so as to avoid the need for a large memory size. The above example of the point levels will be used to explain this feature. Using the above example, award library 1 should include all awards worth up to 500 points. Award library 2 should include all awards worth from 501–1000 points, etc. Thus, if the user is qualified, for example, for point level 2, access is made to award libraries 1 and 2. Thus, duplication of awards in the various libraries is prevented.

A further option would be to flag the various awards according to the point level for which they are qualified. Accordingly, when the point level of the user has been determined, the awards are scanned for the appropriate flag and the qualified award library is created in this manner. While this feature does not eliminate step 430, the qualified award library can be built in less time than by scanning the required points and comparing each required point to the available points.

By selecting VIEWING OPTIONS 450, the user may set the order in which to view the awards. Thus, for example, the user may view the awards by alphabetical order, enter a ceiling point number for viewing all awards up to that ceiling, view awards by product or brand, etc. The award catalog of the program of the preferred embodiment includes a feature whereby when a particular award is shown, it includes information regarding how many points are required to redeem that particular award, and how many points the user is short of in order to redeem that particular award.

Figure 6:
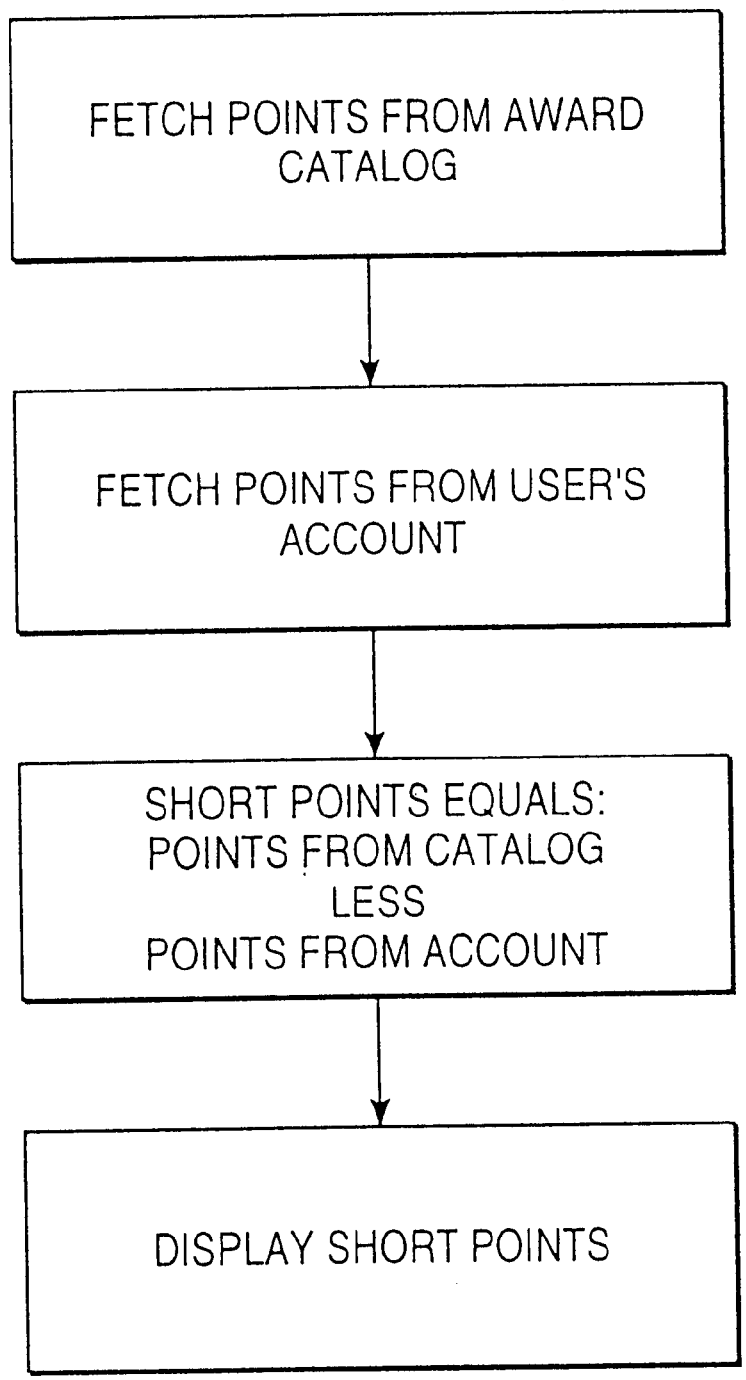
FIG. 6 is a flow chart showing an exemplary routine to determine the number of points the user is short of for redeeming a particular product.

To implement the above mentioned feature, the program accesses the user's account in the frequency database and reads the amount of award points the user has in his account. Then, whenever the program displays a particular product, the program subtracts the number of point available in the user's account from the number of points required to redeem the award. The result is displayed as the number of points the user is short of to redeem that award. Of course, if the user is not enrolled in the program or does not have any award points in his account, the number of point the user is short of will be equal to the number of points required to redeem the award. An exemplary flow chart is shown in FIG. 6.

Another particular feature for viewing the award catalog is shown in FIG. 4. The user is provided with an access to the frequency database via FREQUENCY DATABASE 460. While in FIG. 4 FREQUENCY DATABASE 460 is shown to proceed from VIEWING OPTION 450, it would be appreciated that access to the frequency database and the routine of the feature described below can be provided in other places in the program.

Upon accessing the frequency database, the user may view the account to verify the amount of redeemable points recorded therein. Thereafter, the user may enter any ceiling awards points of the user's choice, 470, for viewing the awards worth up to that ceiling, 475. Processing for displaying the qualified awards can then proceed as shown in steps 435, 440, and 500 in branch E of FIG. 4.

In the preferred embodiment, the user may enter the REDEEM routine 500 at any point in the program. In FIG. 4 this feature is represented by the several REDEEM 500 selections depicted at many points of the program. When entering the REDEEM routine, the user may be prompted to enter the account number, the identification code or both, 510. This is similar to the description provided with respect to step 350 in FIG. 3. Thus, only the identification code may be required if on-line access was gained via an on-line provider. Thereafter, the proper award to be redeemed is determined.

It should be noted that if the REDEEM 500 step has been entered into from an award page, the award described in that particular page may be automatically read into the REDEEM 500 routine as the selected award. However, the user may be prompted to verify that this is the correct award he wished to redeem and enter appropriate selections, such as color, size, etc. Otherwise, the user may simply be prompted to enter the award by, for example, an award code. It should also be noted that if the user has designated the ceiling award points, the user's account needs to be accessed to verify that the user has sufficient points to redeem the chosen award, 515.

The proper amount of points is then subtracted from the user's account and an adjustment is made in the frequency database, 520. A link is then established to the fulfillment house or directly to the product manufacturer and an award order is communicated, 530. Thereafter, the program returns to the PROGRAM HOMEPAGE 300.

In the description of the preferred embodiment, the term "user" also refers to merchants, product manufacturers, award program administrators, etc. These particular users may be provided with a special access code. Upon entering the special code, these particular users may be provided with a privileged access to the program which allows them to make limited changes to the data. Thus, for example, a merchant may use this special access to change a price charged for a particular product. Similarly, a program administrator may gain privileged access to enter newly added awards available through the program. In addition, in the preferred embodiment a report is generated upon each privileged entry so that the changes made can be monitored.

Certain variations would be apparent to those skilled in the art, which variations are considered within the spirit and scope of the claimed invention.

What is claimed is:

1. A system for an incentive award program, including a computer system accessible for on-line interactive communication with users, said computer system comprising;
   a microprocessor comprising:
   a first memory area for storing a product catalog, said product catalog including product descriptions and product prices for each product available for purchase;
   a second memory area for storing an awards catalog, said awards catalog including an award description and award points value for each award; and
   a frequency database storing account information for each enrolled user of said incentive award program; and
   a display for browsing at least one of said product catalog and said awards catalog.

2. The system of claim 1, wherein said computer system is programmed to perform the steps comprising:
   providing a user with an on-line access to a product homepage and an award program homepage, said product homepage linking to said first memory area, and said award program homepage linking to said second memory area;
   providing said user with an on-line order form for ordering a product for purchase, said order form being susceptible to electronic entries; and,
   providing said user with an on-line redeeming form for redeeming award points towards an award chosen from said awards catalog, said redeeming form being susceptible to electronic entries.

3. The system of claim 2, wherein said computer is further programmed to perform the steps comprising:
   receiving said electronic entries and striping electronic entries corresponding to predetermined queries of said order form; and,
   establishing an on-line link to a predesignated computer and sending said electronic entries to said predesignated computer via said on-line link to verify available credit.

4. The system of claim 2, wherein said computer is further programmed to receive said electronic entries and to perform the steps comprising:

establishing an on-line link to an order computer determined from said entries in said order form, and electronically sending via said on-line link selected ones of said entries of said order form to said order computer.

5. The system of claim 2, wherein said computer is further programmed to receive said electronic entries and to perform the steps comprising:

reading a price entry from said order form and calculating award points according to a predefined formula using said price as a parameter in said predetermined formula;

saving said award points in an award account of said user; and, subtracting from said award account a redeemed points amount corresponding to a redeemable value of an award designated in said redeeming form.

6. The system of claim 2, wherein said computer is further programmed to perform the steps comprising:

receiving an electronic request to view said awards catalog;

defining an award ceiling depending on qualified award points in an awards account of a user sending said request; and, displaying awards having award point value equal to said award ceiling and awards having award value lower than said award ceiling.

7. The system of claim 2, wherein said computer is further programmed to perform the steps comprising:

receiving said electronic entries from a user and determining whether an electronic link for receiving said electronic entries has been established by an on-line provider;

When said electronic link has been established by an on-line provider, electronically interrogating provider database for a credit account number of said user; and, establishing an on-line link to a predesignated computer and sending said credit account number to said predesignated computer via said on-line link to verify available credit.

8. The system of claim 4, wherein said computer is further programmed to receive said electronic entries and perform the steps comprising:

establishing an on-line link to an award computer and electronically sending via said on-line link selected ones of said entries of said redeeming form to said award computer.

9. The system of claim 2, wherein said computer is further programmed to perform the steps comprising:

providing said user with an on-line subscription form for enabling said user to join said incentive award program, said subscription form being susceptible to electronic entries; and, receiving entries corresponding to said subscription form and establishing an award account in said frequency database for said user.

10. A method for providing an on-line shopping and frequency award program comprising the steps of:

maintaining a frequency database for storing award points in award accounts corresponding to subscribed users;

providing an on-line access to a product catalog;

providing a means for browsing said product catalog including products available for purchase;

providing an on-line purchase order form, said on-line purchase order form including at least a register for a credit account number of a credit card and a register for a product identifier;

allowing a user to electronically send entries for said purchase order form;

establishing an on-line link to a credit computer and verifying availability of funds for said user;

establishing an on-line link to a computer of a seller of a product identified in said product identifier and electronically communicating said purchase order form together with said entries to said seller;

calculating award points by a predetermined formula taking into account a price of said product, and updating an award account of said user in said frequency database;

providing an on-line access to an award catalog having a plurality of files corresponding to various award articles;

providing a means for browsing said award catalog including awards available for redemption;

providing an on-line award redeem form;

receiving electronic entries corresponding to queries in said award redeem form to allow said user to electronically redeem award points towards a chosen award from said award catalog; and subtracting from said award account of said user a number of points corresponding to the award points of said chosen award.

11. The method for providing an on-line shopping and frequency award program as claimed in claim 10, further comprising the steps of:

Receiving a request from said user to review said award catalog;

defining a ceiling point corresponding to the amount of redeemable award points stored in said award account of said user; and, displaying award files having an award value equal to or less than said award ceiling.

12. The method for providing an on-line shopping and frequency award program as claimed in claim 10, further comprising the steps of:

Receiving a request from said user to review said award catalog;

defining a ceiling point as the amount of points entered by said user in a response to an inquiry; and, displaying award files having an award value equal to or less than said award ceiling.

13. The method for providing an on-line shopping and frequency award program as claimed in claim 10, further comprising the steps of:

assigning a value for each award article of said award catalog;

defining a plurality of escalating levels;

assigning each of said award articles to only one of said plurality of escalating levels, depending on the value assigned to each of said articles;

receiving a request to review said award articles, and determining a level to which said request corresponds depending on the award points to stored in said award account of said user; and, making available for review only those articles corresponding to the level to which said request corresponds and any lower level.

14. The method for providing an on-line shopping and award program as claimed in claim 10, further comprising the steps of:
   determining whether said on-line access has been established via an on-line provider; and,
   electronically extracting a credit account information of said user from a computer file of said on-line provider.

15. A computer readable substrate having a computer program saved thereupon, said computer program comprising the steps of:
   providing a user with an on-line access to a product homepage and an award program homepage, said product homepage linking to a searchable product database of products available for purchase, and said award program homepage linking to a searchable awards catalog of awards available for redemption;
   providing said user with a means for browsing through said product database of products and said awards catalog of awards;
   providing said user with an on-line order form for ordering a product for purchase, said order form being susceptible to electronic entries;
   receiving said electronic entries and striping predetermined entries corresponding to predetermined queries of said order form; and
   establishing an on-line link to a predesignated computer and sending said predetermined entries to said predesignated computer via said on-line link to verify available credit.

16. The computer readable substrate of claim 15, wherein said program further comprises the steps of:
   establishing an on-line link to an order computer of a seller of a product designated by said entries in said order form, and electronically sending via said on-line link selected ones of said entries of said order form to said order computer.

17. The computer readable substrate of claim 16, wherein said program further comprises the steps of:
   reading a price entry from said order form and calculating award points according to a predefined formula; and,
   saving said award points in an award account of said user.

18. The computer readable substrate of claim 17, wherein said program further comprises the steps of:
   providing said user with an on-line redeeming form for redeeming award points towards an award chosen from said awards catalog, said redeeming form being susceptible to electronic entries; and,
   subtracting from said award account a redeemed points amount corresponding to a redeemable value of said award chosen.

19. The system for an incentive award program of claim 1, wherein said account information for each enrolled user comprises a plurality of registers each for indicating an enrollment level of one of said enrolled users.

20. The system for an incentive award program of claim 19, wherein said product catalog includes enrollment level required for each of said products available for purchase, and wherein access for purchasing a product is restricted to users qualified for said enrollment level of said product.

21. The method of claim 10, further comprising the steps of defining a first and a second enrollment levels and storing in said award accounts of said users an enrolled level each of said subscribed users qualifies.

22. The method of claim 21, further comprising the steps of determining to which of said first and second award levels each of said awards corresponds and disqualifying users of said first award level from redeeming award points towards awards corresponding to said second award level.

23. The computer readable substrate of claim 17, wherein said program further comprises the steps of:
   determining an award level to which said user qualifies based on predetermined parameters; and,
   storing said award level in said award account of said user.

24. The system of claim 2, wherein said computer is further programmed to receive said electronic entries and to perform the steps comprising:
   reading a price entry from said order form and calculating award points according to a predefined formula using said price as a parameter in said predetermined formula;
   saving said award points in an award account of said user; and,
   subtracting from said award account a redeemed points amount corresponding to a redeemable value of an award designated in said redeeming form.

25. The system of claim 2, wherein said computer is further programmed to receive said electronic entries and to perform the steps comprising:
   reading a price entry from said order form and calculating award points according to a predefined formula using quantity of products purchased as a parameter in said predetermined formula;
   saving said award points in an award account of said user; and,
   subtracting from said award account a redeemed points amount corresponding to a redeemable value of an award designated in said redeeming form.

26. The system of claim 2, wherein said computer system further comprises an access code and wherein data of said computer system can be changed by said user when said user enters said access code.

27. The system of claim 2, wherein said computer is further programmed to perform the steps comprising:
   fetching pre-designated information from said product catalog and defining said information as entry data for said order form.

28. The system of claim 2, wherein said computer is further programmed to perform the steps comprising:
   fetching a number of required points required to redeem an award from said award catalog;
   fetching a number of redeemable points available account information of one of said enrolled users' stored in said frequency database;
   subtracting the number of available points from the number of required points and transmitting the results to a computer of said user.

29. The system of claim 1, wherein the products in said product catalog are listed alphabetically.

30. The method for providing an on-line shopping and award program as claimed in claim 10, wherein said products available for purchase are listed alphabetically.

31. The computer readable substrate of claim 15, wherein said products available for purchase are listed alphabetically.

32. The system of claim 1, wherein said user directly browses said product catalog or arranges a new list of products according to the needs of said user.

33. The method for providing an on-line shopping and award program as claimed in claim 10, wherein said user directly browses said product catalog or arranges a new list of products according to the needs of said user.

34. The computer readable substrate of claim 15, wherein said user directly browses said product catalog or arranges a new list of products according to the needs of said user.

* * * * *